US010054845B1

(12) United States Patent
Garcia et al.

(10) Patent No.: US 10,054,845 B1
(45) Date of Patent: Aug. 21, 2018

(54) PORTABLE COMMUNICATION DEVICE WITH CAMERA MOUNTING MECHANISM

(71) Applicant: MOTOROLA SOLUTIONS, INC., Chicago, IL (US)

(72) Inventors: Jorge L. Garcia, Plantation, FL (US); Boon Aik Eeo, Bayan Lepas (MY); Ban Hin Ooi, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/841,450

(22) Filed: Dec. 14, 2017

(51) Int. Cl.
*G03B 17/56* (2006.01)
*G03B 17/55* (2006.01)
*G03B 17/12* (2006.01)
*G03B 37/04* (2006.01)
*G03B 31/00* (2006.01)
*G03B 11/04* (2006.01)

(52) U.S. Cl.
CPC .......... *G03B 17/561* (2013.01); *G03B 11/041* (2013.01); *G03B 17/12* (2013.01); *G03B 17/55* (2013.01); *G03B 31/00* (2013.01); *G03B 37/04* (2013.01)

(58) Field of Classification Search
CPC ............................ G03B 17/561; H04N 5/2252
See application file for complete search history.

(56) References Cited

U.S. PATENT DOCUMENTS

| 4,895,286 A | 1/1990 | Derosa |
| 5,829,652 A | 11/1998 | Denzer et al. |
| 5,886,739 A | 3/1999 | Winningstad |
| 8,786,680 B2 | 7/2014 | Shiratori et al. |
| 8,941,777 B1 | 1/2015 | Ratner |
| 9,083,860 B2 | 7/2015 | Sabripour et al. |
| 9,554,041 B1 | 1/2017 | Shin et al. |
| 2003/0133008 A1 | 7/2003 | Stephenson |
| 2003/0173383 A1 | 9/2003 | Greene |
| 2003/0215010 A1 | 11/2003 | Kashiwa |
| 2008/0024883 A1* | 1/2008 | Iwasaki ................. G02B 7/022 359/808 |
| 2016/0098138 A1 | 4/2016 | Park et al. |

(Continued)

FOREIGN PATENT DOCUMENTS

WO   2017119653 A1   7/2017

OTHER PUBLICATIONS walmart.com, Shoulder Mount Support Pad Stabilizer for Video DV Camcorder HD DSLR DV Camera, https://www.walmart.com/ip/Shoulder-Mount-Support-Pad-Stabilizer-for-Video-DV-Camcorder-HD-DSLR-DV-Camera/825037903[6/21/2017 1:00:01 PM, all pages.

(Continued)

*Primary Examiner* — Noam Reisner
(74) *Attorney, Agent, or Firm* — Barbara R. Doutre

(57) ABSTRACT

A camera mounting mechanism for a portable communication device provides a unitary cylindrical camera housing having an opening for receiving a hemispherical camera lens of an optical sub-assembly. A heat sink wall is fitted into a base opening of the housing. Another heat sink dissipates heat from a microprocessor. A replaceable lens cap assembles to the exterior surface of the unitary cylindrical camera housing to retain and seal the camera module. The mounting of the threaded lens cap to the outside of the camera housing negates leak paths.

23 Claims, 7 Drawing Sheets

(56) References Cited

U.S. PATENT DOCUMENTS

| 2016/0112636 | A1  | 4/2016 | Yamaguchi et al. |            |
|--------------|-----|--------|------------------|------------|
| 2017/0078537 | A1* | 3/2017 | Peddecord        | H04N 5/2252 |
| 2017/0105510 | A1  | 4/2017 | Tran et al.      |            |
| 2017/0131621 | A1* | 5/2017 | Tang             | G03B 17/02 |
| 2017/0195533 | A1* | 7/2017 | Seo              | G02B 7/021 |
| 2017/0195563 | A1* | 7/2017 | Ribeiro          | H04N 5/23238 |

OTHER PUBLICATIONS

Samsung—parts.net, Samsung Gear 360(2016) Lenses—Samsung-parts.net, http://www.samsung-parts.net/epages/Samsung-Parts.sf/en_GB/?ObjectPath=/Shops/Samsung-Parts/Products/GH67-02946A, downloaded from internet: Nov. 9, 2017, all pages.

\* cited by examiner

PORTABLE COMMUNICATION DEVICE WITH CAMERA MOUNTING MECHANISM

FIELD OF THE INVENTION

The present invention relates generally to portable communication devices and more particularly to a portable body worn communication device having a video camera.

BACKGROUND

Public safety environments, such as law enforcement and fire rescue, are increasingly seeking out improved approaches to capturing event information. To this end, there is growing interest in providing improved video recording of public safety scenes and events. While there exist consumer type communication devices with video options, such devices are not typically suitable in public safety applications. Video equipment operating within a public safety environment may be exposed to harsh conditions, including water, dust, and even undesired physical contact. These, and other conditions, may lead to the camera lens being scratched or otherwise damaged as well as issues with leakage. Attempting to incorporate video technology into a public safety communication device presents challenges associated with regards to size, weight, ease of manufacturability, sealing, ruggedness and user interface.

Accordingly, it would be beneficial to have a video communication device in a small, sealed form factor better suited to public safety type environments.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
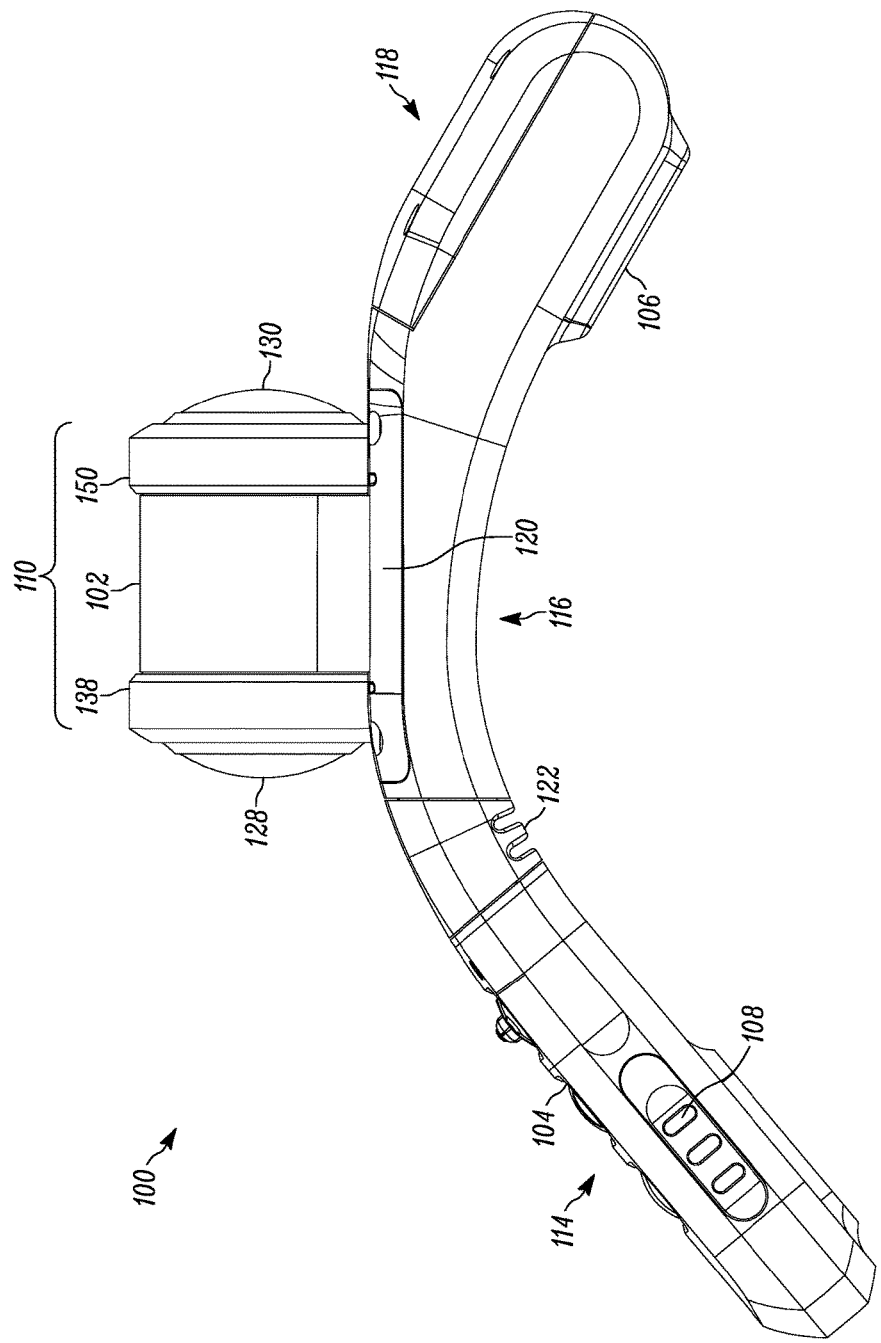
FIG. 1 is a portable communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a portable communication device with camera mounting module that provides a removable and replaceable lens cap that retains and seals the camera lens. The sealed module minimizes overall size thereby facilitating portability as a body worn device.

In a first embodiment, a camera module comprises a unitary cylindrical housing having concentric openings within which first and second hemispherical camera lenses are mounted and retained by an O-ring to provide a full spherical field of view. The camera module is assembled using an outside-to-inside approach which provides retention and sealing of an internal optical sub-assembly. First and second replaceable lens caps, having threaded features, each assemble to the unitary cylindrical housing to further retain and seal the camera module. The threaded features may comprise partially threaded features and/or locking tabs. The mounting of the partially threaded lens cap to the outside of the unitary camera housing negates any leak paths. Heat sinks are provided for heat dissipation of camera sensors and a microprocessor within camera module. The unitary cylindrical housing further comprises a base portion to facilitate mounting the camera module to a portable communication device.

In a second embodiment, a camera module comprises a unitary cylindrical housing having an opening within which a single hemispherical camera lens is mounted and retained by an O-ring to provide a 360 degree field of view. The camera module is assembled using an outside-to-inside approach which provides retention and sealing of an internal optical sub-assembly. A replaceable lens cap having partial thread features assembles to the cylindrical housing to further retain and seal the camera module. Again, the threaded features may comprise partially threaded features and/or locking tabs. The mounting of the threaded lens cap to the outside of the unitary camera housing negates any leak paths. A heat sink is provided for heat dissipation of a sensor and microprocessor. The unitary cylindrical housing further comprises a base portion to facilitate mounting the camera module to a portable communication device.

The shoulder mounted communication device having the camera module of the various embodiments advantageously provides hands-free operation while the device is worn at the shoulder, and as such is particularly beneficial for public safety environments, such as law enforcement, fire and rescue environments. The mounting and sealing mechanism provided by the various embodiments allow the lens cap to be removed and replaced with the lens cap becomes scratched or otherwise damaged.

Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a communication device 100 formed in accordance with a first embodiment. The communication device 100 is a portable, body wearable device for shoulder worn usage particularly well suited to public safety environments, such as law enforcement and fire rescue. The communication device 100 comprises a portable housing formed of front, middle, and back portions 114, 116, 118 respectively configured in a reverse u-shape formation for flexible shoulder mountable and conformable applications. A remote speaker microphone (RSM) 104 is integrated into the front housing portion 114, a camera module 110 is integrated into the middle housing portion 116, and a battery 106 is integrated into the back housing portion 118. The easily assembled camera module 110 is highly beneficial to portable body worn devices as will be described herein.

Describing briefly the portable communication device 100, the RSM 104 integrated within the front housing portion 114 comprises a speaker, a microphone, and a push-to-talk (PTT) button, all under the control of one or more internal processors and interoperable with an internal transceiver. The battery 106 powers the RSM 104 and the camera module 110. Hence, the communication device 100 provides a battery powered shoulder mountable portable communication device well suited for operation as a public safety communication device. Camera operation of the portable communication device 100 is enabled either manually through a dedicated button 108 or automatically in response to some predetermined input to the portable communication device, such as a press to the PTT button (shown in FIG. 2) with verbal command "start video" to the RSM microphone.

The communication device 100 may be formed of ruggedized plastic with flexible section 122 jointed between the RSM 104 and camera module 110 and may further comprise additional jointed sections, such as between the camera module 110 and battery 106 for increased conformability to provide for a shoulder conformable flexible device. The flexible section 122 may further comprise flex or wired interconnects running therethrough to electrically and mechanically couple the RSM 104 electronics to the camera module 110 and the battery 106. Locating the battery 106 on the back portion 118 of the communication device 100 advantageously provides balance with the front mounted RSM 104.

In accordance with this first embodiment, the camera module 110 comprises a unitary cylindrical camera housing 102 having at least one replaceable lens cap, shown here as first and second replaceable lens caps 128, 130 coupled through partially threaded portions 138, 150 to housing 102. The first and second replaceable lens caps 128, 130 protect first and second internal video imagers contained therein (shown in later views) which each provide a 360 degree field of view. The imagers and lens caps are assembled in a back-to-back configuration to provide a full spherical field view.

Figure 2:
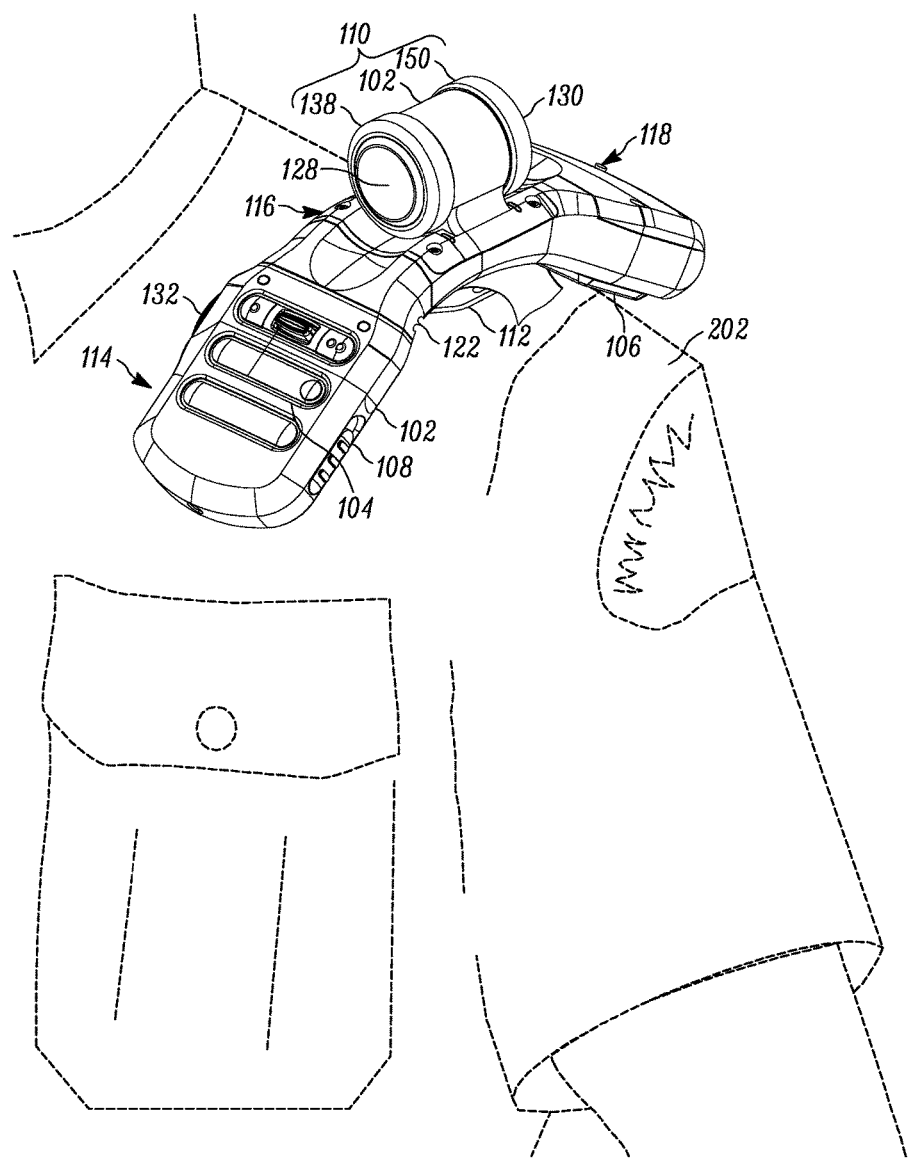
FIG. 2 another view of the portable communication device of FIG. 1 in accordance with some embodiments.

Referring to FIG. 2, the shoulder mountable communication device 100 is shown mounted to a user's shoulder 202 and operating as a public safety communication device. A variety of attachment features 112, including but not limited to clips, snaps, magnets, slide-in features, hook and loop, straps, shoulder harness or holster arrangements and/or epaulette interfaces can be used to mount the public safety communication device to the shoulder. The attachment features 112 may be located on one or more portions (front, middle, and/or back portions 114, 116, 118) of the shoulder mountable portable communication device 100 to ensure that the device remains optimally situated for each individual and for optimal image capturing by the camera module 110. The flexibility of the front, middle and back portions 114, 116, 118 an adjustable positioning provided by the attachment features 112 can be used to advantageously ensure a customized flush mount fit for each individual body configuration and proportion.

Once the communication device 100 is mounted to the user's shoulder, the user is able to record video in a hands-free manner. The ability to capture video in a hands-free manner allows the user to continue operating the RSM 104, and/or other electronic devices, and/or performing other public safety activities, such as arrests. Camera operation of the portable communication device 100 is enabled either manually through the dedicated button 108 or automatically in response to some predetermined input to the portable communication device, such as a press to the PTT button 132 with verbal command "start video" to the RSM microphone. Hands-free recording of video is thus available to the user with a maximum field of view in an unencumbered manner.

In accordance with the first embodiment, protection and sealing of the camera module 110 is provided via replaceable lens caps 128, 130, even as the communication device 100 is exposed to harsh environments, such as water, dust and debris. The ability to easily replace the lens caps 128, 130 allows the device to be properly maintained so that clear video capturing can take place. The ability to maintain clear video capturing translates to improved edge analytics processing taking place at the communication device 100, such as license plate and facial recognition processes. The replaceable lenses advantageously negate having to take video recordings through scratched or damaged camera lenses.

The ability to capture video in a hands-free manner allows the user to continue operating the RSM 104, and/or other electronic devices. In some embodiments, the processing capabilities of the RSM 104 may further be used to control the electronics of the camera module 110 thus advantageously providing for a portable RSM controlled camera providing a full spherical field of view. In other embodiments, the camera module 110 may comprise its own processor. While communication device 100 is worn at the shoulder, communications with a portable radio (not shown) can take place for transmission of video information to a cloud based server where cloud analytics may be the performed.

Figure 3:
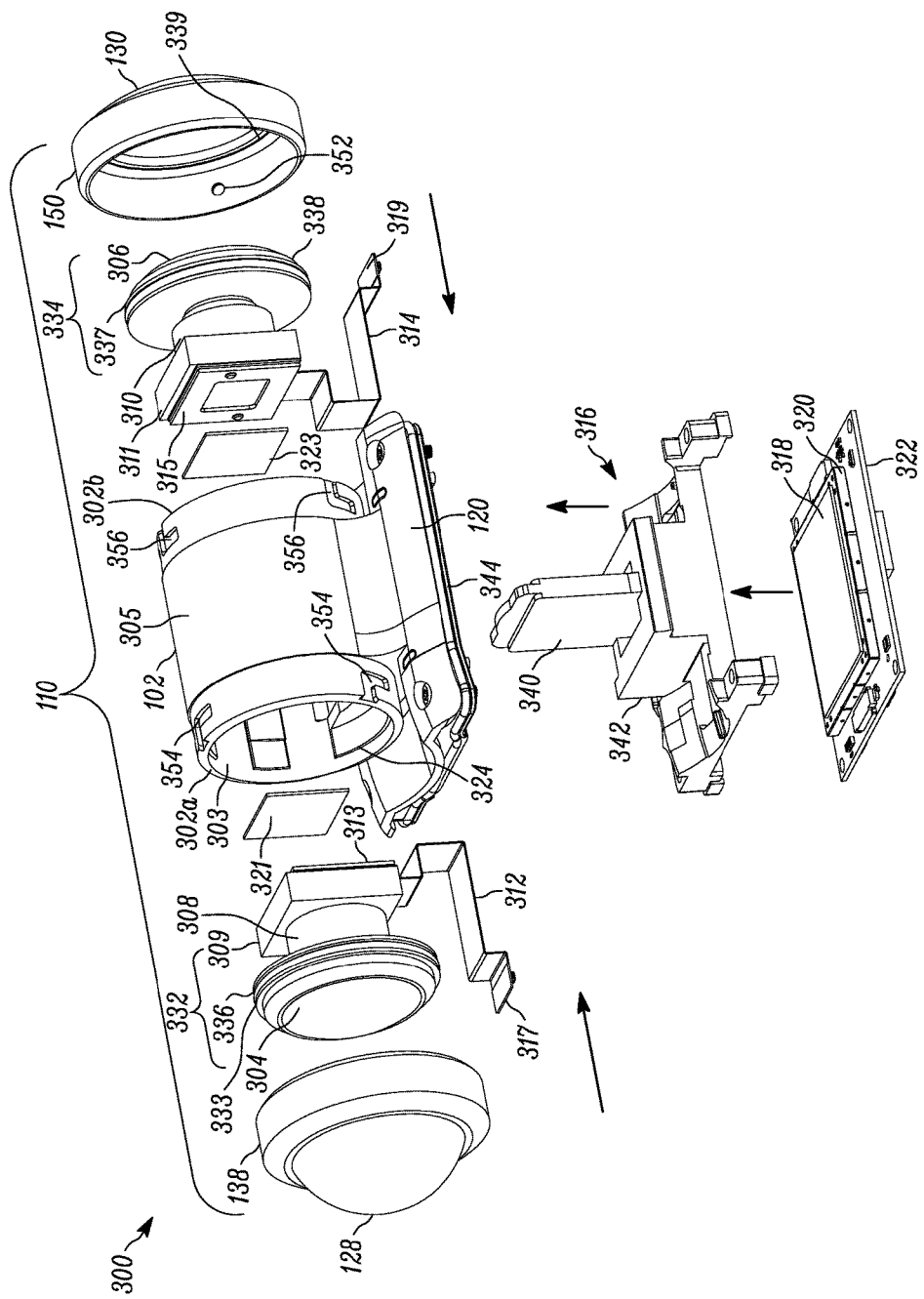
FIG. 3 is an exploded view of a camera module of the portable communication device in accordance with some embodiments.
Figure 4:
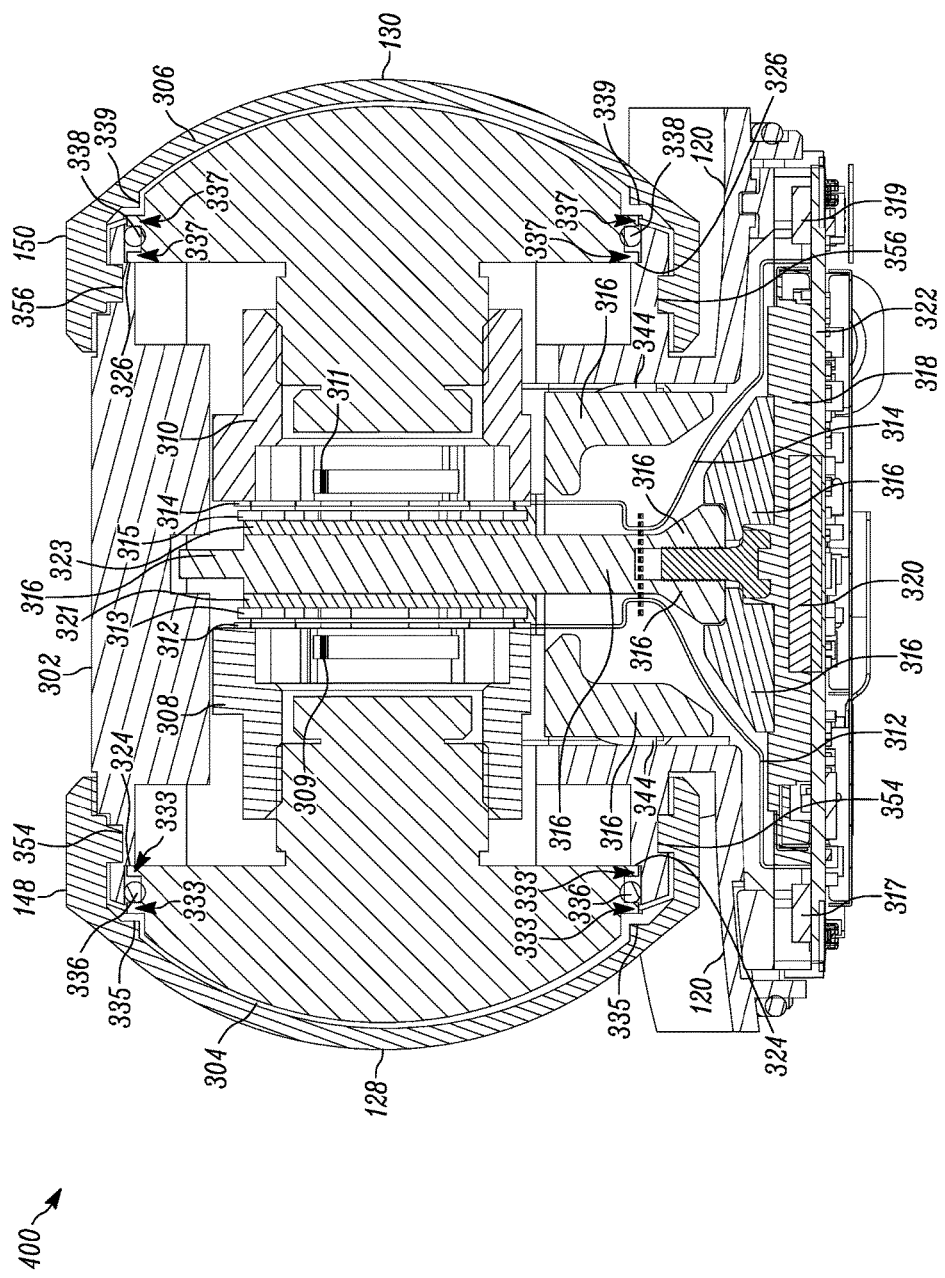
FIG. 4 is a cross-sectional view of the camera module of the portable communication device of FIG. 1 in accordance with some embodiments.

FIG. 3 is an exploded view 300 of the camera module 110 in accordance with the first embodiment. FIG. 4 is a cross-sectional view of the assembled camera module of FIG. 3. Referring to FIGS. 3 and 4, the camera module 110 comprises the unitary cylindrical camera housing 102 having an inner surface 303, an exterior surface 305, a first lens opening 302a, a second lens opening 302b, the first and second lens openings being concentric and located at opposing ends of the unitary cylindrical camera housing. The camera module 110 further comprises a base portion 120 formed as part of the unitary cylindrical housing 102 which facilitates mounting the camera module horizontally to a communication device, such as the portable shoulder mounted communication device of FIGS. 1 and 2.

The camera module 110 further comprises a first wide angle optical sub-assembly 332 having a first hemispherical camera lens 304, a first lens holder 308, a first sensor 309, and a first flex 312. The camera module 110 further comprises a second wide angle optical sub-assembly 334 having a second hemispherical lens 306, a second lens holder 310, a second sensor 311, and a second flex 314. Metal plates 313, 315 are back plated to each flex 312, 314 at a first end of each flex. A second end of each respective flex 312, 314 comprises an interface connector 317, 319 for mating with a printed circuit board (pcb) 322, the printed circuit board having a microprocessor 320 disposed thereon.

In accordance with the embodiment, the first sub-assembly 332 of the camera module 110 further comprises a first radial O-ring 336 coupled about a base perimeter of the first hemispherical camera lens 304, and the second sub-assembly 334 further comprises a second radial O-ring 338 coupled about a base perimeter of the second hemispherical camera lens 306. Additional seals may be used if desired.

A plurality of stop fit features 333, 335, 337, 339, 324, 326 are used in addition to the threaded portions 138, 150 of first and second caps 128, 130 to couple and seal each of the camera lenses 304, 306 to the housing 102 as described in the following paragraphs.

The threaded portion 138 of first cap 128 is lock fit to the housing 102 using, for example, an inner cap protrusion(s) that slide and twist into partial thread feature 354, formed here as an inverted "L" shaped groove, located on the exterior surface 305 of housing 102. A first lens stop feature 333 located at first hemispherical camera lens 304 retains the first radial O-ring 336. The threaded portion 138 of first cap 128 comprises a first cap stop feature 335 which stop fits to the first lens stop feature 333 thereby providing a lens cap-to-camera lens stop fit at the first end of the module 110. The first cap stop feature 335 bottoms out with the corresponding first lens stop feature 333 upon assembly of the threaded cap portion 138 to the housing 102. The lens stop feature 333 then loads against an interior ledge stop feature 324 of housing 102 as a final stop for the lens to the housing 102. The partial thread features 354 and stop features 333, 335, 324 advantageously provide sealing of the first hemispherical camera lens 304 from dust and water.

The threaded portion 150 of second cap 130 is lock fit to the housing 102 using, for example, an inner cap protrusion(s) 352 that slide and twist into partial thread feature(s) 356 located on the exterior surface 305 of cylindrical housing 102. A second lens stop feature 337 located at second hemispherical camera lens 306 retains the second O-ring 338. The threaded portion 150 of second cap 130 comprises a second cap stop feature 339 which stop fits to the second lens stop feature 337 thereby providing a lens cap-to-camera lens stop fit at a second end of the module 110. The second cap stop feature 339 bottoms out with the corresponding second lens stop feature 337 upon assembly. The second lens stop feature 337 then loads against an interior ledge stop feature 326 of housing 102 as a final stop for the lens to the housing 102. The partial thread features 356 and stop features 337, 339, 326 advantageously provide sealing of the second hemispherical camera lens 306 from dust and water.

In accordance with this embodiment, the first wide angle optical sub-assembly 332 is insertably coupled into the first lens opening 302a of the unitary cylindrical camera housing 102, and the second wide angle optical sub-assembly 334 is insertably coupled into the second lens opening 302b of the unitary cylindrical camera housing 102.

In accordance with the embodiments, the first radial O-ring 336 provides compressible coupling, retention and a first seal between the first hemispherical camera lens 304 and the inner surface 303 of the unitary cylindrical camera housing 102. The second radial O-ring 338 provides compressible coupling, retention and a second seal between the second hemispherical camera lens 306 and the inner surface 303 of the unitary cylindrical camera housing 102. In accordance with the embodiments, the first and second hemispherical camera lenses 304, 306 protrude externally from the unitary cylindrical camera housing 102 to provide a full spherical field of view.

In accordance with this embodiment, the first replaceable threaded lens cap 128 is coupled to the exterior surface 305 of the unitary cylindrical camera housing 102 around the first lens opening 302a and first O-ring 336 thereby securing and sealing the first hemispherical camera lens 304 protruding from the cylindrical unitary camera housing 102. The second replaceable threaded lens cap 130 is coupled to the exterior surface 305 of the unitary cylindrical camera housing 102 around the second lens opening 302b thereby securing and sealing the second hemispherical camera lens 306 protruding from the unitary cylindrical camera housing 102.

The camera module 110 further comprises a heat sink opening 344 located at the base portion 120 between first and second ends of the unitary cylindrical camera housing 102, which further facilitates the outside-to-inside approach of assembly the module. Again, the base portion 120 is formed as part of the unitary housing 102. In accordance with this embodiment, a heat sink 316 is insertably coupled through the heat sink opening 344. In accordance with this embodiment, the heat sink 316 comprises two portions formed of a first heat sink portion 340 and a second heat sink portion 342, coupled via a screw 341. In accordance with this embodiment, the first heat sink portion 340 forms a wall between the first and second sensors 309, 311 for dissipating heat generated therefrom, while the second heat sink portion 342 dissipates heat generated by the microprocessor 320.

A first thermal pad 321 may be coupled to the first flex 312, and a second thermal pad 323 may coupled to the second flex 314, for example using adhesive coupling. Alternatively, the first and second thermal pads 321, 323 may be coupled, such as by adhesive coupling, to the opposing walls of the first heat sink portion 340. Upon insertion of the first and second optical sub-assemblies 332, 334 into first and second ends of the unitary cylindrical camera housing 102, the first and second thermal pads 321, 323 are compressibly coupled against opposing walls of the first heat sink portion 340. The first and second compressible thermal pads 321, 323 take up stack up tolerances of the assembly.

A third thermal pad 318 is coupled to the microprocessor 320 of pcb 322. The second heat sink portion 342, screwed to the first heat sink portion 340 via screw 341, is also insertably coupled through the heat sink opening 344 of the unitary cylindrical camera housing 102. In accordance with this embodiment, the third thermal pad 318 of the microprocessor 320 compressibly couples to the second heat sink portion 342 to dissipate heat generated from the microprocessor.

In this embodiment, the use of independent heat sink portions 340, 342 is preferred because the microprocessor 320 produces a substantial amount of heat based on such processes associated with video recording, such as for example: edge analysis, video de-warping, and stitching of two video streams. Thus, the heat sinking of the first and second sensors 309, 311 can be handled by the first heat sink portion 340, while the substantial heat of the microprocessor 320 can be handled by the second heat sink portion 342. The use of the use of independent heat sink portions 340, 342 also facilitates dressing the flexes 312, 314. However, as long as care is taken to dress the flexes 312, 314, the first and second heat sink portions 340, 342 can be screwed together forming the heat sink 316 and inserted into heat sink opening 344 as a single assembly. As to the replaceable lens caps 128, 130, the use of partially threaded portions 138, 150 is preferred, as opposed to a fully threaded interconnect, so that a shorter angle of rotation can be used to mount each cap to the assembly thereby facilitating the assembly process while providing sealing.

The assembly steps may be performed by inserting the first heat sink portion 340 through heat sink opening 344 of the housing's base portion 120. The front and rear camera sub-assemblies 332, 334 are inserted into their respective openings with the flex tails being dressed out from the base, heat sink opening 344. The front and rear lens caps 128, 130 are then mounted via the partial thread interconnects and the stop features. The front and rear lens caps 128, 130 push/load the respective sub-assemblies 332, 334 towards the respective thermal pads 321, 323 of each side of the first heat sink. The second heat sink portion 342 is then screwed to the first heat sink portion 340. The first and second flex interface connectors 317, 319 are then snapped to corresponding connectors on the pcb 322. The pcb 322 may be sandwiched between the cylindrical housing 102 and base portion 120. The completed camera housing assembly may be mounted via base portion 120, using screws or other interconnect means, to a portable communication device, such as the shoulder communication device 100, for a full spherical field of view.

During assembly, the first sub-assembly 332 is inserted into the first opening of the housing 102 such that the first sensor metal plate 313 is loaded against the first thermal pad 321 of the first heat sink 340. The first lens cap 128 is mounted to the housing 102 via threaded portion 138 of the lens cap and partial thread features 354 of housing 102. During the mounting of the lens cap 128 to the cylindrical housing 102, the first cap stop feature 335 is pushed inward and abuts with the first lens stop feature 333 (which retains the first O-ring 336). The lens stop feature 333 then loads against the interior ledge stop 324 of cylindrical housing 102 as a final stop for the lens. The sub-assembly 332 is thus compressibly coupled and sealed by the lens cap 128 to the cylindrical housing 102 with stack up tolerances being taken up by the first thermal pad 321.

Similarly, the second sub-assembly 334 is inserted into the second opening of the housing 102 such that the second sensor metal plate 315 is loaded against the second thermal pad 323 of the first heat sink 340. The second lens cap 130 is screwed on to the housing 102 via threaded portion 150 of the lens cap and partial thread features 356 of the housing 102. During the mounting of the second lens cap 130 to the cylindrical housing 102, the second cap stop feature 339 is pushed inward and abuts with the second lens stop feature 337 (which retains the second O-ring 338). The second lens stop feature 337 then loads against the interior ledge stop 326 of cylindrical housing 102 as a final stop for the lens. The second sub-assembly 334 is thus compressibly coupled and sealed by the second lens cap 130 having second threaded portion 150 to the cylindrical housing 102 with stack up tolerances being taken up by the second thermal pad 323.

Figure 5:
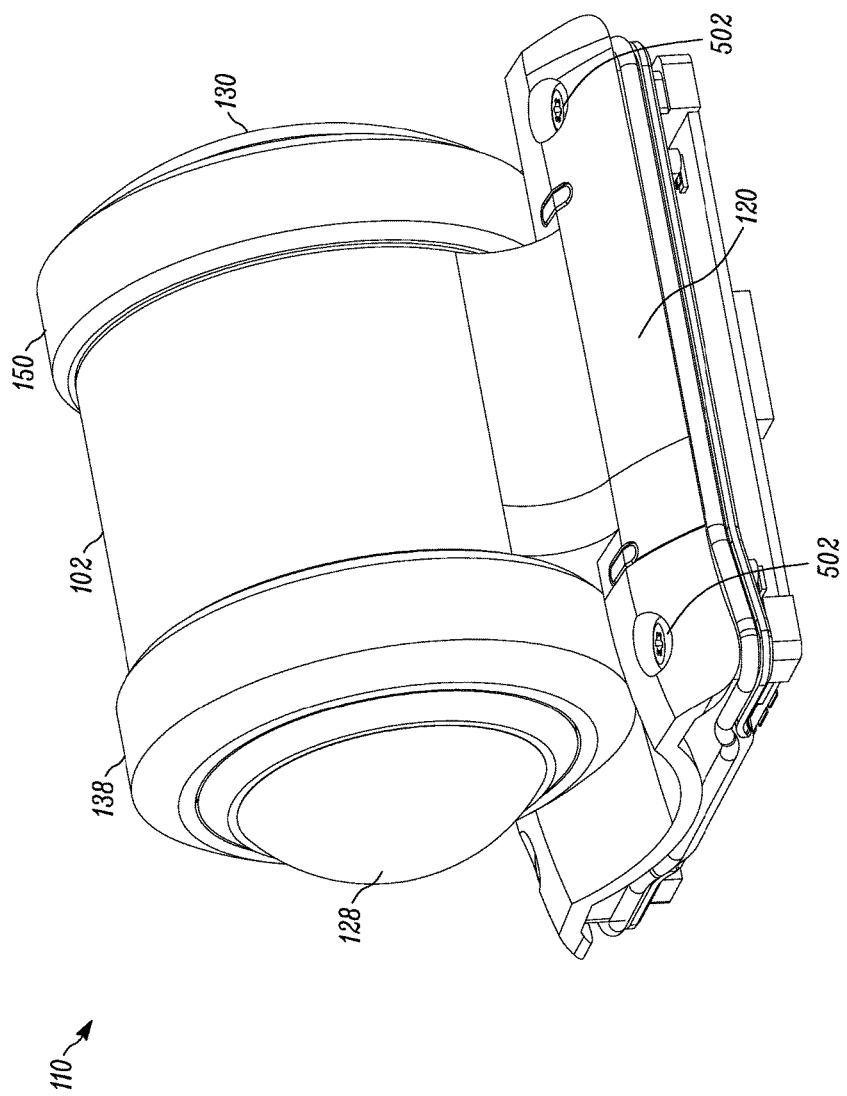
FIG. 5 is an assembled view of a camera module in accordance with some embodiments.

FIG. 5 shows an assembled view of a camera module 110 in accordance with some embodiments. The cylindrical camera housing 102 sits horizontally along its base portion 120 for coupling to a communication device, such as via screws 502 or other interconnect means. The first and second replaceable lens caps 128, 130 retain and seal their respective internal camera lenses (shown in FIGS. 3 and 4) thereby protecting the camera lenses from scratches and preventing leaks to the overall module. The first and second hemispherical camera lenses are located directly behind the lens caps, each providing a 360 degree field of view, which when mounted in the horizontal, back-to-back configuration provide a full spherical field view. The camera module 110 provides appropriate heat sinking as previously described.

Figure 6:
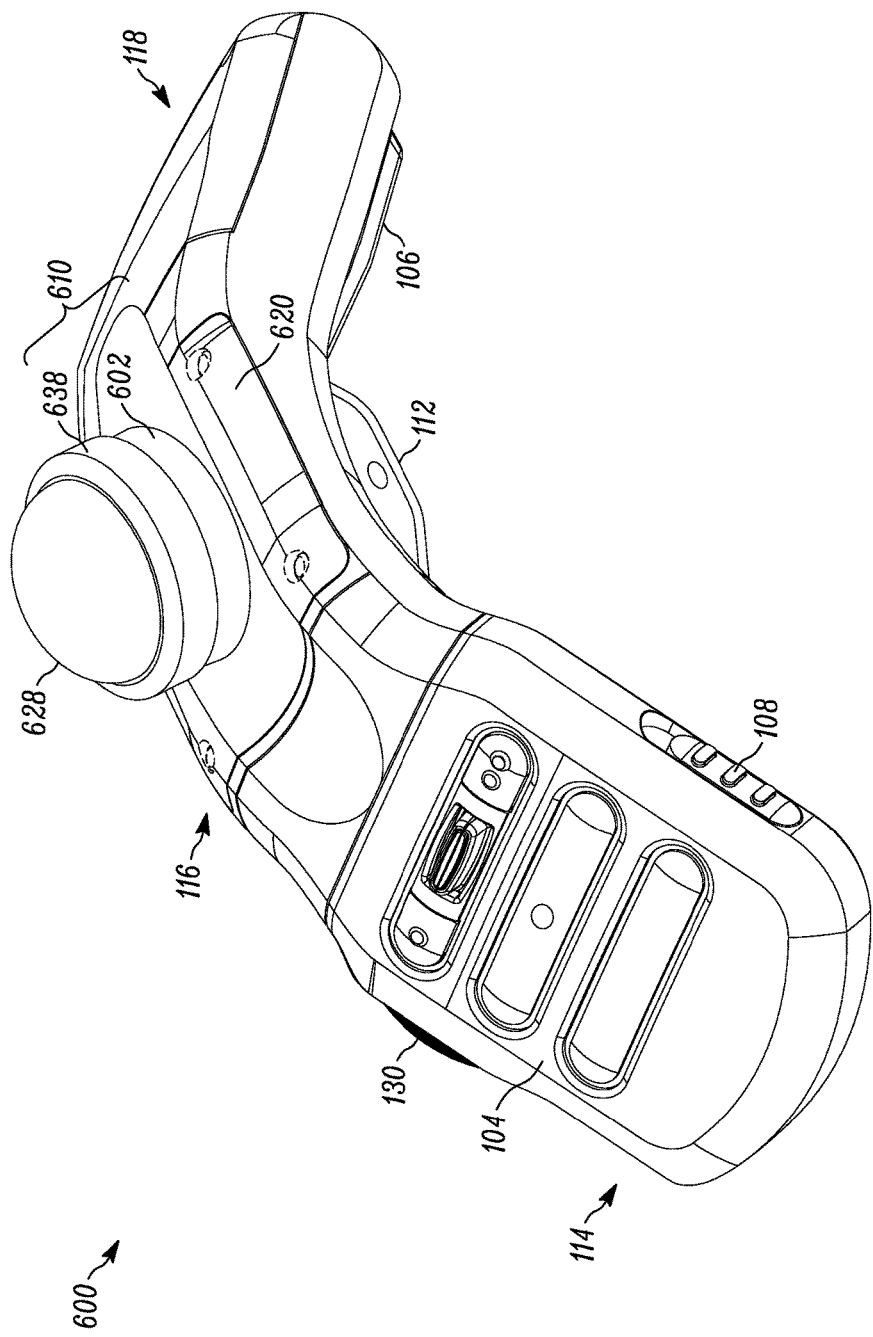
FIG. 6 is a portable communication device in accordance with another embodiment.

FIG. 6 is a portable communication device 600 formed in accordance with a second embodiment. The portable communication device 600 is a portable shoulder mountable device, similar to that of FIG. 1, comprising a housing formed of first, second and third housing portions respectively, and also referred to as front, middle and back portions 114, 116, 118 respectively configured in a reverse u-shape formation for flexible shoulder mountable and conformable applications. In accordance with the embodiments, the remote speaker microphone 104 and the battery 106 are distributed amongst the front and back housing portions 114, 118 respectively. The middle housing portion 116 comprises a camera module 610 formed in accordance with this second embodiment.

The camera module 610 of the second embodiment comprises a unitary cylindrical housing 602 having a base portion 620, the base portion being mounted atop the middle housing portion 116 of communication device 600. The battery powered shoulder mountable communication device 600 having the RSM 104 and camera module 610 incorporated therein is particularly well suited for operation as a public safety communication device wherein the camera module 610, in accordance with this second embodiment, provides a 360 degree field of view. The camera module 610 of the portable communication device 600 is assembled using an outside-to-inside approach which provides retention, sealing and heat sinking of a single internal optical sub-assembly.

In accordance with this second embodiment, the camera module 610 comprises a single hemispherical lens cap 628 screw mounted via a threaded portion 638 to the cylindrical housing 602 for protecting and sealing the internal optical sub-assembly. The replaceable lens cap 628 is threaded to an exterior surface of the unitary cylindrical camera housing 602 around the lens opening thereby securing and sealing the protruding hemispherical lens to the camera housing.

Figure 7:
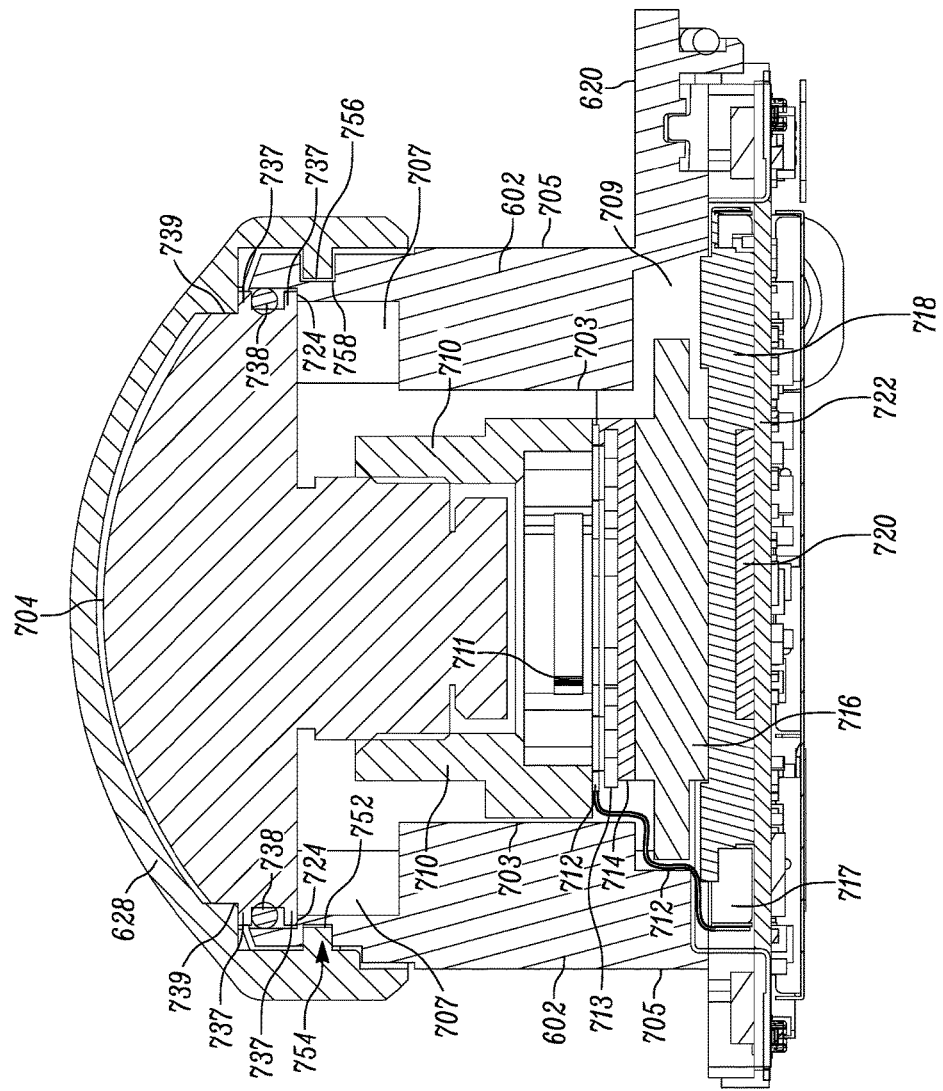
FIG. 7 is a cross-sectional view of the camera module of the portable communication device of FIG. 6 in accordance with some embodiments.

FIG. 7 is a cross-sectional view of the camera module 610 of FIG. 6 in accordance with the second embodiment. The camera module 610 comprises the unitary cylindrical camera housing 602 formed of a vertical cylindrical shaped housing having an inner surface 703, an exterior surface 705, a lens opening 707 at a first, top end, and a heat sink opening 709 at a second, opposite base end 620. A wide angle optical sub-assembly is insertably coupled into the lens opening 707. The wide angle optical sub-assembly comprises a hemispherical camera lens 704, a lens holder 710, a sensor 711, and a flex 712. The flex is backed with a metal plate 713 at a first end to dissipate heat from sensor 711. A first thermal pad 714 compressibly couples between the metal plate 713 of flex 712 and a heat sink 716. The heat sink 716 is insertably coupled within the heat sink opening 709 of the unitary cylindrical camera housing 602. The first compressible thermal pad 714 takes up stack up tolerances of the assembly in addition to heat dissipated from the sensor 711 via the metal plate 713 of the flex 712.

A radial O-ring 738 is coupled about a base perimeter of the single hemispherical camera lens 704. The radial O-ring 738 provides compressible coupling, retention and a seal between the hemispherical camera lens 704 and the inner surface 703 of the unitary cylindrical camera housing 602. The radial O-ring 738 is retained within a lens stop feature 733 located about a base perimeter of the hemispherical camera lens 704. The hemispherical camera lens 704 protrudes externally from the cylindrical camera housing 602 for a 360 degree field of view.

In accordance with this second embodiment, the single replaceable lens cap 628 comprises a cap stop feature 739 that provides a stop fit with the lens stop feature 737. In accordance with this second embodiment, the single replaceable lens cap 628 comprises interior partial threaded portions 754, 756 for coupling to corresponding thread features 752, 758 located on the exterior surface 705 of the unitary cylindrical camera housing 602 thereby securing and further sealing the hemispherical camera lens 704 protruding from the unitary cylindrical camera housing 602. Again, the use of a partial threaded interconnect with stop features facilitates assembly allowing for shorter angle of rotation to be used to mount the cap while providing sealing to the lens.

The flex 712 comprises an end connector 717 for coupling to a printed circuit board (pcb) 722 having a microprocessor 720 disposed thereon. The microprocessor 720 controls electronics for the camera module 610, such as edge analysis, video de-warping, and the like. In accordance with this embodiment, a second thermal pad 718 is coupled to the microprocessor 720. The second thermal pad compressibly couples to the heat sink 716 to dissipate heat from the microprocessor. Hence, this embodiment provides for heat dissipation via the single heat sink 716.

Accordingly, there has been provided a portable, body wearable communication device having a video camera in a small, sealed form factor well suited to public safety environments. The outside-to-inside assembly approach of the camera module facilitates manufacturability providing for a small, lightweight, sealed, and rugged device. The ease of assembly facilitates incorporation of the camera module into a shoulder mountable portable public safety communication device to advantageously provide for battery powered RSM and video features in a single communication device. The mounting and sealing mechanism provided by the various embodiments accommodates both horizontal and vertical mounting configurations and allow the lens cap to be removed and replaced if the lens cap becomes scratched or otherwise damaged.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A camera module for a portable communication device, comprising:
   a unitary cylindrical camera housing having an inner surface, an exterior surface, a lens opening, and a heat sink opening;
   a wide angle optical sub-assembly having a hemispherical camera lens, a sensor, and a flex;
   a radial O-ring retained within a lens stop feature located about a base perimeter of the hemispherical camera lens;
   wherein the wide angle optical sub-assembly is insertably coupled into the lens opening of the unitary cylindrical camera housing, the radial O-ring providing compressible coupling, retention and a seal between the hemispherical camera lens and the inner surface of the unitary cylindrical camera housing, the hemispherical camera lens protruding externally from the unitary cylindrical camera housing for a 360 degree field of view; and
   a replaceable lens cap having a partial thread feature and a cap stop feature, the partial thread feature coupled to the exterior surface of the unitary cylindrical camera housing around the lens opening of the unitary cylindrical camera housing, and the cap stop feature coupled to the lens stop feature of the radial O-ring of the hemispherical camera lens, thereby securing and sealing the protruding hemispherical camera lens to the unitary cylindrical camera housing.

2. The camera module of claim 1, wherein the replaceable lens caps is removable and replaceable by a user while the portable communication device is being worn.

3. The camera module of claim 1, further comprising:
   a first thermal pad coupled to the flex.

4. The camera module of claim 3, further comprising:
   a heat sink coupled through the heat sink opening of the unitary cylindrical camera housing, the first thermal pad of the flex compressibly coupling to the heat sink.

5. The camera module of claim 4, further comprising:
   a printed circuit board (pcb) having a microprocessor coupled thereto; and
   a second thermal pad coupled to the microprocessor.

6. The camera module of claim 5, wherein the second thermal pad compressibly couples to the heat sink to dissipate heat from the microprocessor.

7. The camera module of claim 1, wherein the portable communication device is a shoulder mountable portable communication device.

8. The camera module of claim 7, wherein the shoulder mountable portable communication device comprises a public safety communication device.

9. The camera module of claim 7, wherein the shoulder mountable portable communication device further comprises a remote speaker microphone (RSM).

10. The camera module of claim 9, wherein the shoulder mountable portable communication device further comprises a battery for powering the camera module and the RSM.

11. A camera module, comprising:
    a unitary cylindrical camera housing having an inner surface, an exterior surface, a first lens opening, a second lens opening, the first and second lens openings being at opposing ends of the unitary cylindrical camera housing;
    a first wide angle optical sub-assembly having a first hemispherical camera lens, a first sensor, and a first flex;
    a second wide angle optical sub-assembly having a second hemispherical camera lens, a second sensor, and a second flex;
    a first radial O-ring coupled about a base perimeter of the first hemispherical camera lens;
    a second radial O-ring coupled about a base perimeter of the second hemispherical camera lens;
    wherein the first wide angle optical sub-assembly is insertably coupled into the first lens opening of the unitary cylindrical camera housing, and the second wide angle optical sub-assembly is insertably coupled into the second lens opening of the unitary cylindrical camera housing, the first radial O-ring providing compressible coupling, retention and a first seal between the first hemispherical camera lens and the inner surface of the unitary cylindrical camera housing, and the second radial O-ring providing compressible coupling, retention and a second seal between the second hemispherical camera lens and the inner surface of the unitary cylindrical camera housing, the first and second hemispherical camera lenses protruding externally from the unitary cylindrical camera housing to provide a full spherical field of view;
    a first replaceable lens cap threadably coupled to the exterior surface of the unitary cylindrical camera housing around the first lens opening thereby securing and sealing the first protruding hemispherical camera lens to the unitary cylindrical camera housing; and
    a second replaceable lens cap threadably coupled to the exterior surface of the unitary cylindrical camera housing around the second lens opening thereby securing and sealing the second protruding hemispherical camera lens to the unitary cylindrical camera housing.

12. The camera module of claim 11, further comprising:
    a heat sink opening located along a base portion of the unitary cylindrical camera housing between first and second ends; and
    a heat sink coupled through the heat sink opening, the heat sink having a first heat sink portion forming a wall between the first and second sensors.

13. The camera module of claim 12, further comprising:
    a first thermal pad coupled to first flex;
    a second thermal pad coupled to the second flex; and
    the first and second thermal pads being compressibly coupled to opposite sides of the wall formed by the first heat sink portion.

14. The camera module of claim 13, further comprising:
    a printed circuit board (pcb);
    a microprocessor coupled to the pcb; and
    a third thermal pad coupled to the microprocessor.

15. The camera module of claim 14, further comprising:
    a second heat sink portion coupled through the heat sink opening of the unitary cylindrical camera housing, the third thermal pad compressibly coupling to the second heat sink portion to dissipate heat from the microprocessor.

16. The camera module of claim 11, wherein the camera module operates as part of a portable communication device.

17. The camera module of claim 11, wherein the camera module operates as part of a shoulder mountable portable communication device.

18. The camera module of claim 11, wherein the camera module operates as part of a shoulder mountable portable communication device that further comprises a remote speaker microphone (RSM).

19. The camera module of claim 18, wherein the shoulder mountable portable communication device further comprises a battery for powering the camera module and the RSM.

20. The camera module of claim 11, wherein the camera module operates as part of a shoulder mountable portable public safety communication device.

21. The camera module of claim 11, wherein the first replaceable lens cap and the second replaceable lens cap comprise partial thread features and stop fit features.

22. A camera module, comprising:
   a unitary cylindrical housing having an opening within which a single hemispherical camera lens is mounted and retained by an O-ring, the single hemispherical camera lens providing a 360 degree field of view; and
   a replaceable lens cap comprising partially threaded features assembled to the unitary cylindrical housing to further retain the single hemispherical camera lens and seal the camera module.

23. The camera module of claim 22, wherein the replaceable lens cap further comprises a cap stop feature for abutting with a corresponding lens stop feature surrounding the O-ring of the single hemispherical camera lens.

\* \* \* \* \*